(12) United States Patent
Lin et al.

(10) Patent No.: US 11,334,237 B2
(45) Date of Patent: May 17, 2022

(54) SOFTWARE DEFINED ICON INTERACTIONS WITH MULTIPLE AND EXPANDABLE LAYERS

(71) Applicant: Futurewei Technologies, Inc., Plano, TX (US)

(72) Inventors: Zongfang Lin, Santa Clara, CA (US);
Reza Yazdani, Los Altos, CA (US);
Chen Tian, Union City, CA (US);
Lawrence Davison, San Jose, CA (US);
Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/164,423

(22) Filed: Oct. 18, 2018

(65) Prior Publication Data

US 2019/0050131 A1    Feb. 14, 2019

Related U.S. Application Data

(62) Division of application No. 15/199,401, filed on Jun. 30, 2016, now abandoned.

(51) Int. Cl.
*G06F 3/0482* (2013.01)
*G06F 3/0488* (2022.01)
(Continued)

(52) U.S. Cl.
CPC .......... *G06F 3/0488* (2013.01); *G06F 3/0482* (2013.01); *G06F 3/0486* (2013.01);
(Continued)

(58) Field of Classification Search
CPC .. G06F 3/0488; G06F 3/04842; G06F 3/0486; G06F 3/0482; G06F 3/04817;
(Continued)

(56) References Cited

U.S. PATENT DOCUMENTS 5,689,667 A    11/1997  Kurtenbach
6,938,216 B1    8/2005  Ishisaki
(Continued)

FOREIGN PATENT DOCUMENTS

CN    102112946 A    6/2011
CN    103210366 A    7/2013
(Continued)

OTHER PUBLICATIONS

"U.S. Appl. No. 15/199,401, Final Office Action dated Aug. 10, 2018", 18 pgs.
(Continued)

*Primary Examiner* — Rinna Yi (74) *Attorney, Agent, or Firm* — Schwegman Lundberg & Woessner, P.A.

(57) ABSTRACT

A method of controlling an electronic device is provided, comprising receiving a selection contact within a first icon region of a first icon displayed on a pressure-sensing display screen of the electronic device, displaying on the pressure-sensing display screen a second set of icons related to the first icon, detecting that the selection contact uninterruptedly moves to a second icon of the second set of icons and selects the second icon, displaying on the pressure-sensing display screen a third set of icons related to the second icon, detecting that the selection contact uninterruptedly moves to a third icon of the third set of icons and selects the third icon, and initiating an application or function associated with the third icon.

19 Claims, 8 Drawing Sheets

(51) Int. Cl.
*G06F 3/04842* (2022.01)
*H04M 1/72403* (2021.01)
*G06F 3/04817* (2022.01)
*G06F 3/0486* (2013.01)
*H04M 1/725* (2021.01)

(52) U.S. Cl.
CPC ...... *G06F 3/04817* (2013.01); *G06F 3/04842* (2013.01); *H04M 1/725* (2013.01); *H04M 1/72403* (2021.01); *G06F 2203/04105* (2013.01); *G06F 2203/04108* (2013.01)

(58) Field of Classification Search
CPC ......... G06F 3/0414; G06F 2203/04108; G06F 2203/04105; H04M 1/725
See application file for complete search history.

(56) References Cited

U.S. PATENT DOCUMENTS

| | | | |
|---|---|---|---|
| 7,035,909 B1 | 4/2006 | Lee et al. | |
| 2010/0026640 A1 | 2/2010 | Kim et al. | |
| 2010/0318905 A1 | 12/2010 | Rakesh | |
| 2011/0285651 A1 | 11/2011 | Temple | |
| 2012/0068941 A1 | 3/2012 | Arrasvuori et al. | |
| 2013/0147793 A1* | 6/2013 | Jeon | G06F 3/011 345/419 |
| 2013/0268876 A1 | 10/2013 | Cho et al. | |
| 2013/0307776 A1 | 11/2013 | Roziere | |
| 2014/0355024 A1* | 12/2014 | Shigetomi | H04N 1/00469 358/1.13 |
| 2015/0052430 A1* | 2/2015 | Dwan | G06F 3/0482 715/702 |
| 2015/0143299 A1 | 5/2015 | Kim et al. | |
| 2015/0160819 A1* | 6/2015 | Hwang | G06F 3/04817 715/769 |
| 2015/0186397 A1 | 7/2015 | Cueto et al. | |
| 2015/0212692 A1 | 7/2015 | Hyun et al. | |
| 2015/0355805 A1* | 12/2015 | Chandler | G06F 3/04842 715/784 |
| 2016/0124599 A1* | 5/2016 | Joo | G06F 3/0486 715/748 |
| 2016/0147433 A1* | 5/2016 | Lin | G06F 3/04883 715/834 |
| 2018/0004385 A1 | 1/2018 | Lin et al. | |
| 2018/0088676 A1* | 3/2018 | Ach | G06F 3/011 |

FOREIGN PATENT DOCUMENTS

| | | |
|---|---|---|
| CN | 103870092 A | 6/2014 |
| CN | 104285200 A | 1/2015 |
| CN | 105653119 A | 6/2016 |

OTHER PUBLICATIONS

"U.S. Appl. No. 15/199,401, Non Final Office Action dated Apr. 17, 2018", 19 pgs.
"U.S. Appl. No. 15/199,401, Response Filed Jun. 29, 18 to Non Final Office Action dated Apr. 17, 2018", 16 pgs.
"International Application No. PCT/CN2017/090292, International Search Report dated Sep. 29, 2017", (dated Sep. 29, 2017), 12 pgs.
"European Application No. 17819235.7, Extended European Search Report dated May 31, 2019", (dated May 31, 2019), 13 pgs.
"Chinese Application No. 201780041291.0, Chinese Search Report dated Apr. 20, 2020", 3 pgs.
"Chinese Application No. 201780041291.0, First Office Action dated Apr. 17, 2020", (dated Apr. 17, 2020), 18 pgs.

* cited by examiner

SOFTWARE DEFINED ICON INTERACTIONS WITH MULTIPLE AND EXPANDABLE LAYERS

CLAIM OF PRIORITY

This application is a divisional of and claims the benefit of priority to U.S. application Ser. No. 15/199,401, filed Jun. 30, 2016, which application is incorporated by reference as if reproduced herein and made a part hereof in its entirety, and the benefit of priority of which is claimed herein.

TECHNICAL FIELD

The present application is related to user interfaces for electronic devices and systems, and in particular to a graphical user interface (GUI) with icons having multi-layer functionality.

BACKGROUND

Electronic displays use icons as a visual symbol of a link or shortcut to an application performable by the electronic device. Clicking on an icon with a computer mouse or touching the icon displayed on a touchscreen display starts one predefined task or function, such as launching a client application linked to the icon.

As the functionality of electronic devices such as laptops and smartphones continues to increase, functionality of the applications running on the devices increase and the number of applications available continues to increase. Thus, there is a general need for improvement to user interfaces of electronic devices.

SUMMARY

The user interface for electronic devices continues to become more complicated as the functionality of the devices continues to increase. The present subject matter relates to GUIs for electronic devices, and in particular a GUI that provides icons that have multiple layers of functionality to improve navigation to a target function of the electronic device.

One example of an electronic device includes a pressure-sensing display screen configured to display multiple icons and configured to measure a contact pressure of a contact with the pressure-sensing display screen; a sensor device configured to generate an indication representative of a user action relative to the pressure-sensing display screen; and a processor coupled to the pressure-sensing display screen and to the sensor device. The processor is configured to: receive a selection contact within a first icon region of a first icon displayed on the pressure-sensing display screen of the electronic device; display on the pressure-sensing display screen a second set of icons related to the first icon; detect that the selection contact uninterruptedly moves to a second icon of the second set of icons and selects the second icon; display on the pressure-sensing display screen a third set of icons related to the second icon; detect that the selection contact uninterruptedly moves to a third icon of the third set of icons and selects the third icon; and initiate an application or function associated with the third icon.

A method example of controlling an electronic device includes: the electronic device receiving a selection contact within a first icon region of a first icon displayed on a pressure-sensing display screen of the electronic device; the electronic device displaying on the pressure-sensing display screen a second set of icons related to the first icon; the electronic device detecting that the selection contact uninterruptedly moves to a second icon of the second set of icons and selects the second icon; the electronic device displaying on the pressure-sensing display screen a third set of icons related to the second icon; the electronic device detecting that the selection contact uninterruptedly moves to a third icon of the third set of icons and selects the third icon; and the electronic device initiating an application or function associated with the third icon.

This summary is intended to provide an overview of subject matter of the present patent application. It is not intended to provide an exclusive or exhaustive explanation of the invention. The detailed description is included to provide further information about the present patent application.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Icons displayed on a user interface typically have one layer of functionality. One icon is mapped to performing one function, such as starting a client application (e.g., an email application) or rebooting the electronic device or electronic system. An icon typically cannot be used for mapping to multiple applications and an icon is not typically associated with multiple layers of functionality.

Figure 1:
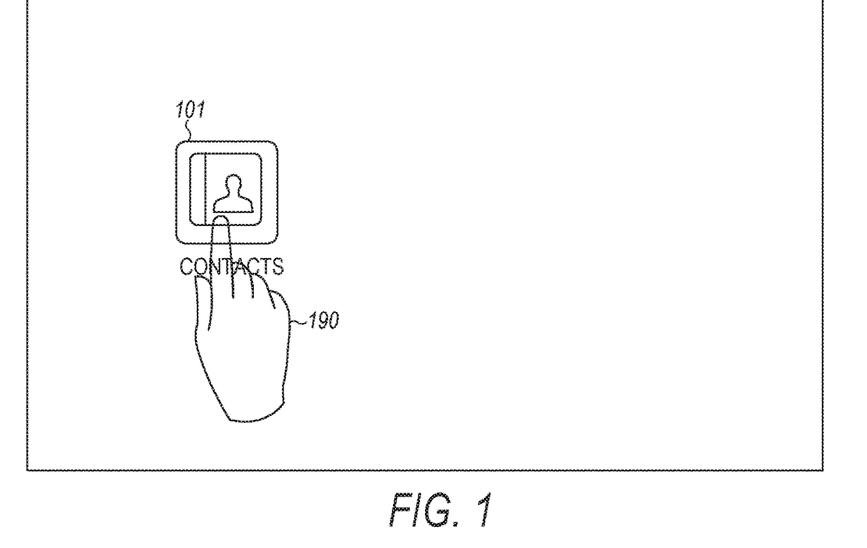
FIG. 1 is a display screen of an electronic device or electronic system.

FIG. 1 shows a display screen 100 of an electronic device. In some embodiments, the display screen 100 comprises a pressure-sensing display screen 100. In other embodiments, the display screen 100 comprises a depth-sensing display screen 100. In yet other embodiments, the display screen 100 comprises both a pressure-sensing and a depth-sensing display screen 100. In a first state, the display screen 100 displays a first icon 101. Only the first icon 101 is shown for simplicity, but it should be understood that other, additional icons could be displayed. The first icon 101 can comprise an icon of a first set of icons (not shown), such as a default display for the electronic device.

The display screen 100 in a pressure-sensing embodiment detects a touch by a user, such as by the user 190 pressing on the display screen 100. The user 190 can generate a selection contact, such as by pressing on the display screen 100 and generating a contact pressure. The user 190 can contact or press on the display screen 100 with a finger, stylus, or any other suitable object. A change in detected contact pressure can be used to select or de-select icons on the display screen 100. In the figure, the user 190 is touching or pressing on the display screen 100 within the area of the first icon 101. The electronic device detects the touch by the user 190 and determines that the user 190 has selected the first icon.

Alternatively, the display screen 100 in a depth-sensing embodiment detects a depth of an object from the display screen 100. The user 190 can generate a selection action by bringing an object into proximity of the display screen 100. The object can be a finger or other portion of the user's body, or can comprise a stylus or other suitable object. A change in detected depth can be used to select or de-select icons on the display screen 100.

Figure 2:
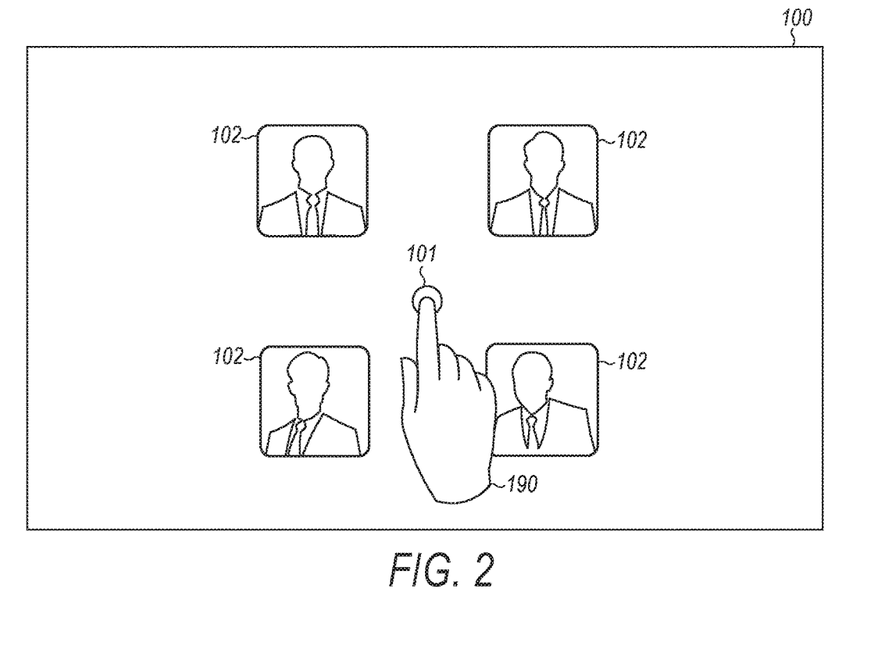
FIG. 2 is the display screen of FIG. 1 displaying a second set of icons.

FIG. 2 shows the display screen 100 wherein the display screen 100 displays a second set of icons 102 in response to detecting the selection of the first icon 101. Four second set icons 102 are shown, but the second set of icons 102 can comprise any number of icons. The second set of icons 102 are related to the first icon 101 in some manner.

In some examples, the electronic device, after detecting the selection of the first icon 101, keeps the first icon 101 on the pressure-sensing display screen 100. The electronic device changes the first icon 101 to visually indicate a first icon non-active state. For example, the first icon 101 can be grayed out. Alternatively, the display screen 100 can show the non-active state of the first icon 101 in any other suitable manner.

Figure 3:
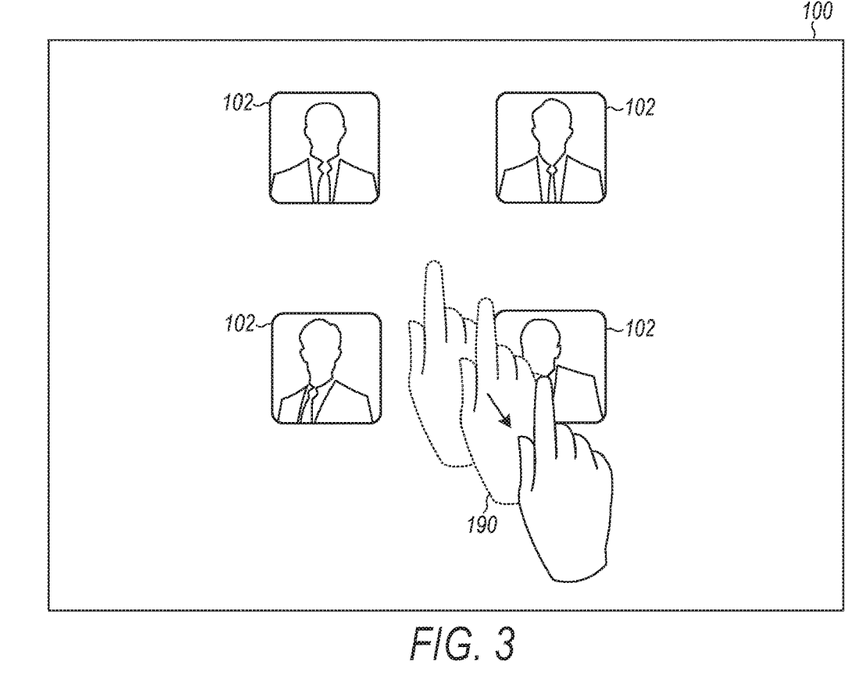
FIG. 3 is another view of the display screen of FIG. 1 where the user maintains selection contact with the display screen moves the selection contact over one of the second set icons.

FIG. 3 shows the display screen 100 wherein the user 190 has maintained selection contact with the display screen 100 and the user 190 has moved the selection contact over one of the second set icons 102. The user 190 in some examples uninterruptedly moves a finger, stylus, or other object from the position shown in FIG. 2 (i.e., over the first icon 101), to the position over the second set icon 102. The electronic device detects the location of the selection contact (or selection action) and determines that the user 190 has selected the second icon 102.

The electronic device in some examples changes the appearance of the other second set icons 102 to visually indicate a second icon non-active state. In some examples, if the user 190 moves away from the selected second icon 102, the other second set icons 102 will return to a display of an active state.

The second icon 102 can be selected in various ways. In a pressure-sensing embodiment, the user 190 moves the selection contact over the second icon 102, or within a specific portion of the second icon 102. In another embodiment, the user 190 moves the selection contact over the second icon 102 and increases contact pressure, wherein contact pressure that exceeds a second pressure threshold is detected as an icon selection. In yet another embodiment, the user 190 moves the selection contact over the second icon 102 and lingers, wherein contact duration that exceeds a predefined linger threshold is detected as an icon selection.

In a depth-sensing embodiment, the user 190 moves the selection action over the second icon 102, or within a specific portion of the second icon 102. In another embodiment, the user 190 moves the selection action over the second icon 102 and decreases the depth, wherein a depth less than a second depth threshold is detected as an icon selection. In yet another embodiment, the user 190 moves the selection action over the second icon 102 and lingers, wherein action duration that exceeds a predefined linger threshold is detected as an icon selection.

Figure 4:
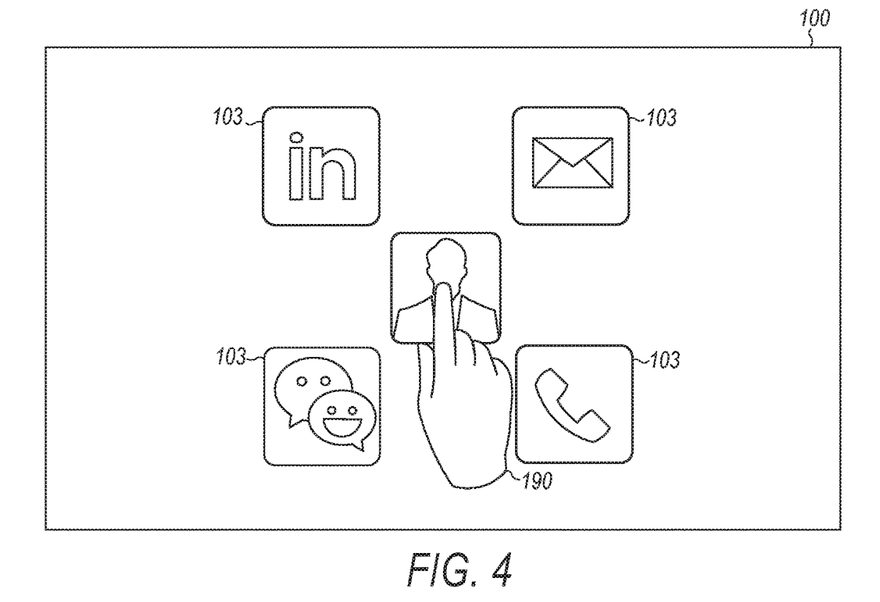
FIG. 4 is the display screen of FIG. 1 displaying a third set of icons.

FIG. 4 shows the display screen 100 wherein the display screen 100 displays a third set of icons 103 in response to detecting the selection of the second icon 102. The second icon 102 is still displayed in the example shown. The user 190 can select a third set icon 103 by moving from over the second set icon 102 to any one of the third set icons 103.

In some examples, the electronic device, after detecting the selection of the second icon 102, keeps the second icon 102 on the display screen 100. The electronic device changes the second icon 102 to visually indicate a second icon non-active state. For example, the second icon 102 can be grayed out. Alternatively, the display screen 100 can show the non-active state of the second icon 102 in any other suitable manner.

Figure 5:
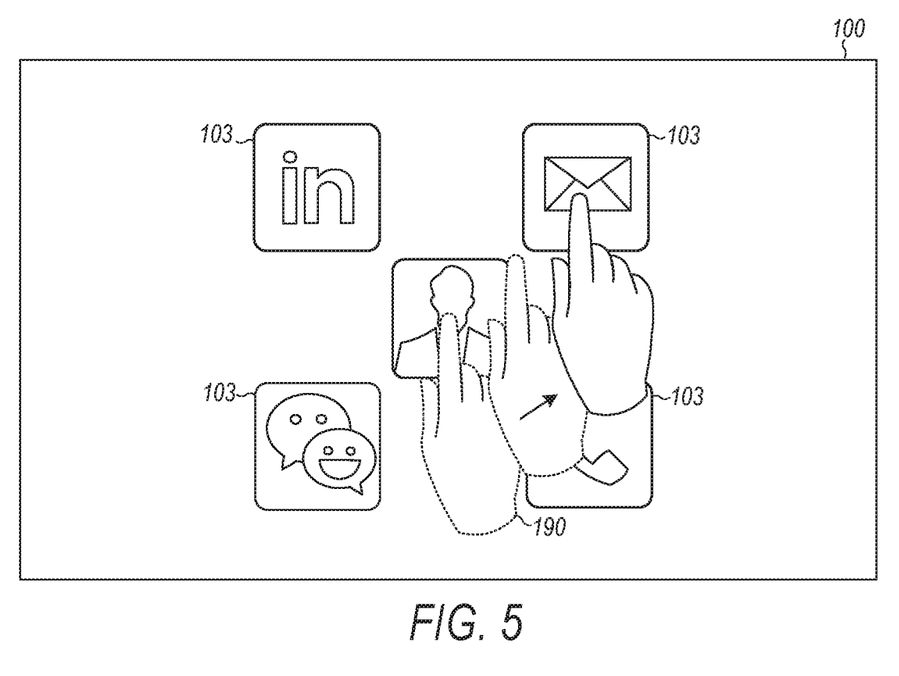
FIG. 5 is another view of the display screen of FIG. 1 where the user maintains selection contact with the display screen moves the selection contact over one of the third set icons.

FIG. 5 shows the display screen 100 wherein the user 190 has maintained selection contact with the display screen 100 and the user 190 has moved the selection contact over one of the third set icons 103. The user 190 in some examples uninterruptedly moves a finger, stylus, or other object from the position shown in FIG. 4 (i.e., over the second icon 102), to the position over the third icon 103. The electronic device detects the selection contact by the user 190 and determines that the user 190 has selected the third icon 103. The electronic device initiates an application or function in response to detecting the selection of the third icon 103. In the example shown, the electronic device opens an e-mail application, with the e-mail application initiating an e-mail to be sent to the contact specified by the second icon 102.

The third icon 103 can be selected in various ways. In one embodiment, the user 190 moves the selection contact over the third icon 103 within a specific portion of the third icon 103. In another embodiment, the user 190 moves the selection contact over the third icon 103 and increases the contact pressure, wherein contact pressure that exceeds a second pressure threshold is detected as an icon selection. In yet another embodiment, the user 190 moves the selection contact over the third icon 103 and lingers, wherein contact duration that exceeds a predefined linger threshold is detected as an icon selection.

Figure 6:
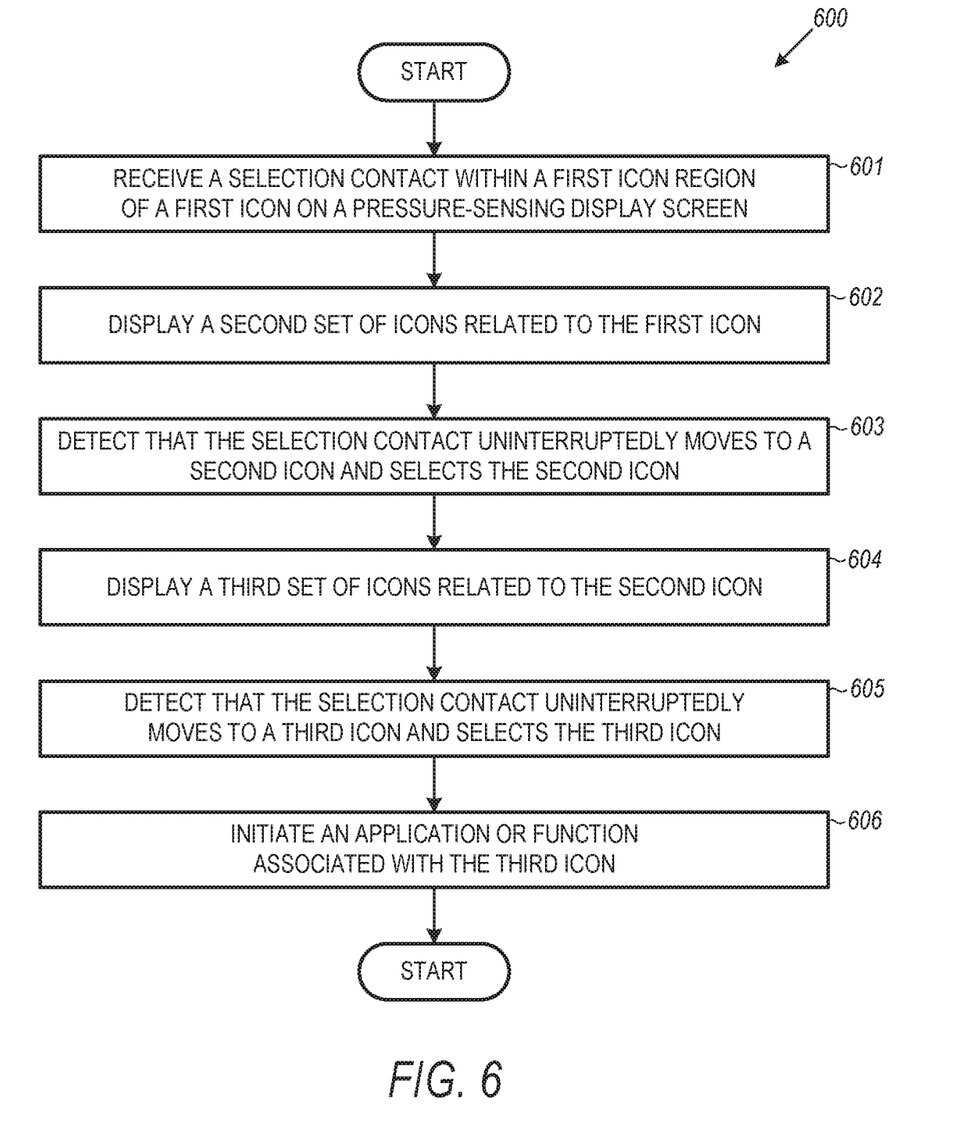
FIG. 6 is a flowchart of a method of controlling an electronic device.

FIG. 6 is a flowchart 600 of a method of controlling an electronic device according to some embodiments. In the embodiments, the electronic device includes a display screen, wherein the display screen comprises a pressure-sensing display screen. The pressure-sensing display screen displays a first icon or a first set of icons. In step 601, the method receives a selection contact within a first icon region of a first icon on the pressure-sensing display screen. The selection contact can comprise a user touching or pressing on the pressure-sensing display screen, such as with a finger. Alternatively, the user can employ a different body part, can employ a stylus, or can employ another suitable object to make the selection contact. In some examples, the selection contact comprises a contact pressure greater than a predefined first pressure threshold. The selection contact comprises contact within a predefined contact area of the first icon, such as within an image or boundary of the first icon, as displayed on the pressure-sensing display screen.

In step 602, the method displays a second set of icons related to the first icon. The second set of icons are displayed as a result of receiving the selection contact. The second set of icons are displayed as active icons that can be selected by the user. The first icon (or first set of icons) can be maintained on the pressure-sensing display screen, can be grayed-out or otherwise visibly altered to indicate an inactive state as a result of receiving the selection contact, or can be removed from the pressure-sensing display screen.

In step 603, the method detects that the selection contact uninterruptedly moves to a second icon and selects the second icon. The selection contact comprises contact within a predefined contact area of the second icon. The uninterrupted selection contact comprises a selection contact wherein contact is maintained with the pressure-sensing display screen. Alternatively, the uninterrupted selection contact comprises a selection contact wherein the selection contact moves without the contact pressure decreasing to less than the predefined first pressure threshold.

In step 604, the method displays a third set of icons related to the second icon. The third set of icons is displayed as a result of detecting the selection contact uninterruptedly moving to and selecting the second icon. The third set of icons are displayed as active icons that can be selected by the user. The second icon (or second set of icons) can be maintained on the pressure-sensing display screen, can be grayed-out or otherwise visibly altered to indicate an inactive state as a result of receiving the selection contact, or can be removed from the pressure-sensing display screen.

In step 605, the method detects that the selection contact uninterruptedly moves to a third icon and selects the third icon. The selection contact comprises contact within a predefined contact area of the third icon. The uninterrupted selection contact comprises a selection contact wherein contact is maintained with the pressure-sensing display screen. Alternatively, the uninterrupted selection contact comprises a selection contact wherein the selection contact increases to above a predefined second pressure threshold.

In step 606, an application or function associated with the third icon is initiated in response to selection of the third icon.

Figure 7:
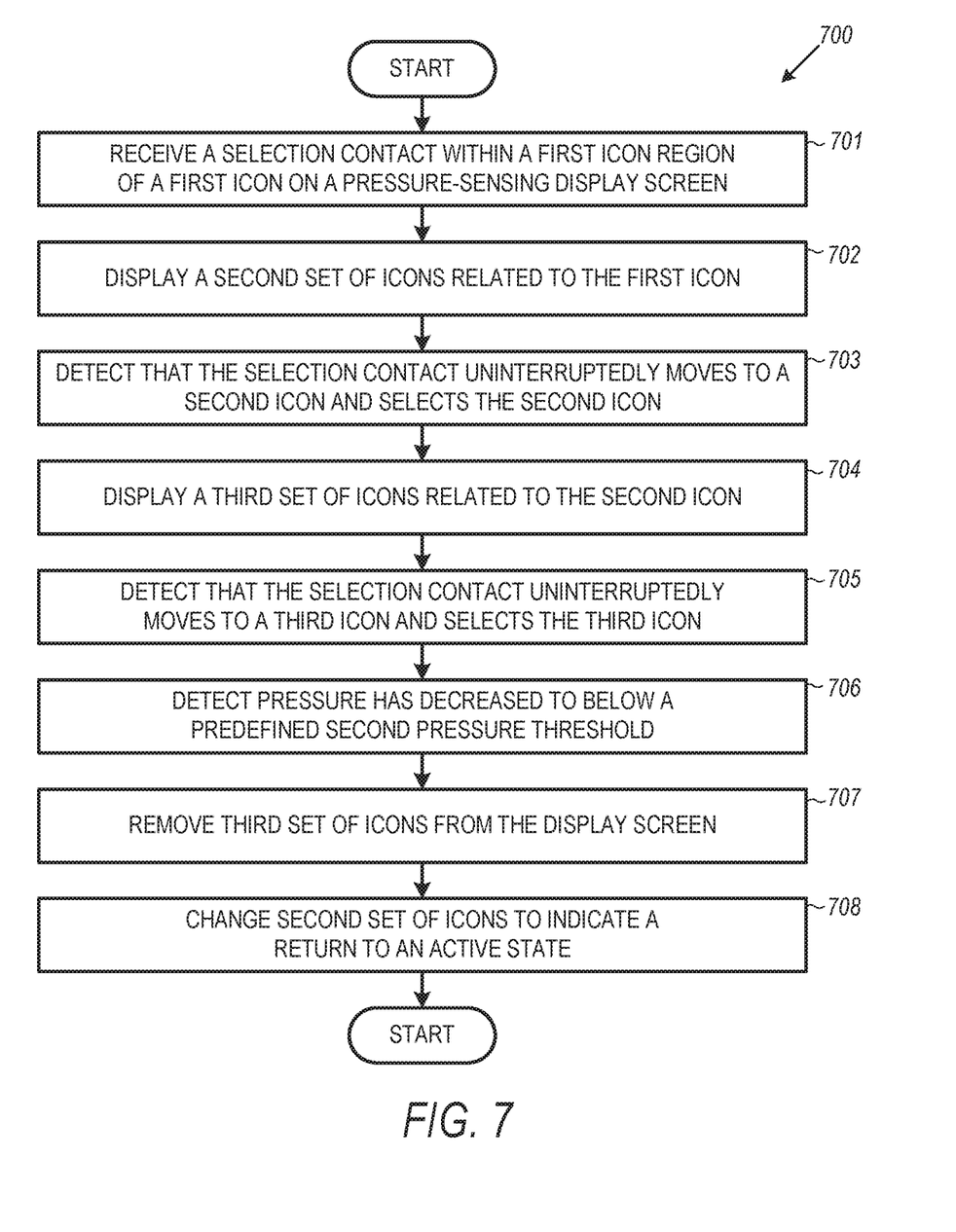
FIG. 7 is a flowchart of another method of controlling an electronic device.

FIG. 7 is a flowchart 700 of another method of controlling an electronic device according to some embodiments. In the embodiments, the electronic device includes a display screen, wherein the display screen comprises a pressure-sensing display screen, as previously discussed. The pressure-sensing display screen displays a first icon or a first set of icons. In step 701, the method receives a selection contact within a first icon region of a first icon on the pressure-sensing display screen, as previously discussed. The selection contact comprises a contact pressure that is greater than a predefined first pressure threshold.

In step 702, the method displays a second set of icons related to the first icon, as previously discussed.

In step 703, the method detects that the selection contact uninterruptedly moves to a second icon and selects the second icon, as previously discussed.

In step 704, the method displays a third set of icons related to the second icon, as previously discussed.

In step 705, the method detects that the selection contact uninterruptedly moves to a third icon and selects the third icon, as previously discussed.

In step 706, the method detects that the contact pressure has decreased to below the predefined second pressure threshold. Consequently, it is determined that the third icon is no longer being selected. The detection of the decrease in the contact pressure can occur before, during, or after detecting the selection of the third icon.

In step 707, the third set of icons is removed from the pressure-sensing display screen, in response to the contact pressure decreasing to below the predefined second pressure threshold.

In step 708, the display of the second set of icons is changed to indicate a return to the active state, in response to the contact pressure decreasing to below the predefined second pressure threshold. Alternatively, the second set of icons can be re-displayed on the pressure-sensing display screen if the second set of icons had been previously removed. A second icon of the second set of icons can now be selected. Alternatively, the second set of icons can be likewise de-selected, or other inputs or actions can occur.

Figure 8:
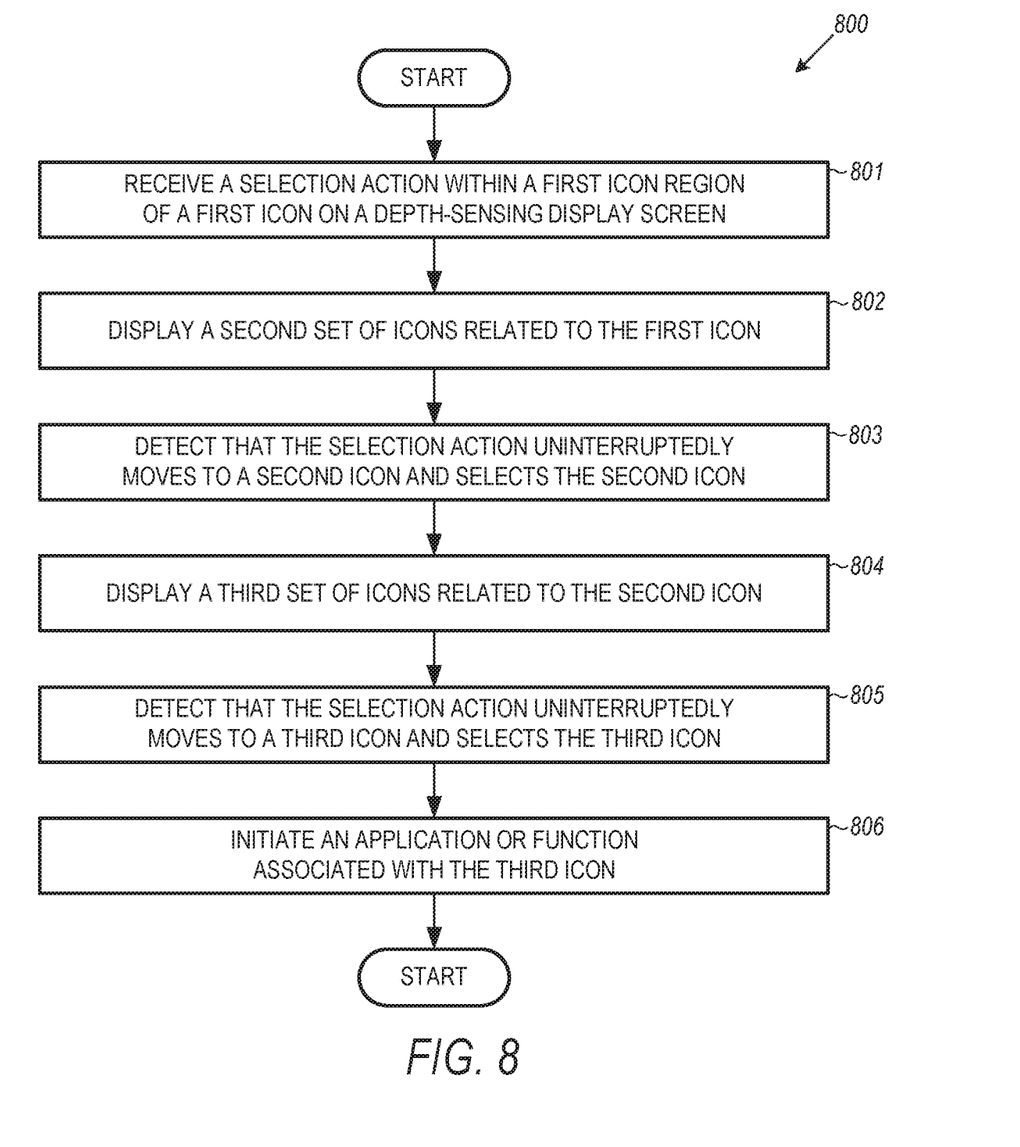
FIG. 8 is a flowchart of still another method of controlling an electronic device.

FIG. 8 is a flowchart 800 of a method of controlling an electronic device according to some embodiments. In the embodiments, the electronic device includes a display screen, wherein the display screen comprises a depth-sensing display screen. The depth-sensing display screen displays a first icon or a first set of icons. In step 801, the method receives a selection action within a first icon region of a first icon on the depth-sensing display screen. The selection action can comprise detecting a depth of an object to the depth-sensing display screen, such as a user coming into proximity of the depth-sensing display screen, such as with a finger. Alternatively, the user can employ a different body part, can employ a stylus, or can employ another suitable object to make the selection action. In some examples, the selection action comprises a depth of the object decreasing to greater than a predefined first depth threshold. The selection action comprises action within a predefined contact area of the first icon, such as within an image or boundary of the first icon, as displayed on the depth-sensing display screen.

In step 802, the method displays a second set of icons related to the first icon. The second set of icons are displayed as a result of receiving the selection action. The second set of icons are displayed as active icons that can be selected by the user. The first icon (or first set of icons) can be maintained on the depth-sensing display screen, can be grayed-out or otherwise visibly altered to indicate an inactive state as a result of receiving the selection action, or can be removed from the depth-sensing display screen.

In step 803, the method detects that the selection action uninterruptedly moves to a second icon and selects the second icon. The selection action comprises action within a predefined contact area of the second icon. The uninterrupted selection action comprises a selection action wherein the depth is maintained from the depth-sensing display screen. Alternatively, the uninterrupted selection action comprises a selection action wherein the selection action moves without the depth increasing to greater than the predefined first depth threshold.

In step 804, the method displays a third set of icons related to the second icon. The third set of icons is displayed as a result of detecting the selection action uninterruptedly moving to and selecting the second icon. The third set of icons are displayed as active icons that can be selected by the user. The second icon (or second set of icons) can be maintained on the depth-sensing display screen, can be grayed-out or otherwise visibly altered to indicate an inactive state as a result of receiving the selection action, or can be removed from the depth-sensing display screen.

In step 805, the method detects that the selection action uninterruptedly moves to a third icon and selects the third icon. The selection action comprises selection action within a predefined contact area of the third icon. The uninterrupted selection action comprises selection action wherein the depth of the object to the depth-sensing display screen is maintained. Alternatively, the uninterrupted selection action comprises selection action wherein the depth decreases to less than a predefined second depth threshold.

In step 806, an application or function associated with the third icon is initiated n response to selection of the third icon.

Figure 9:
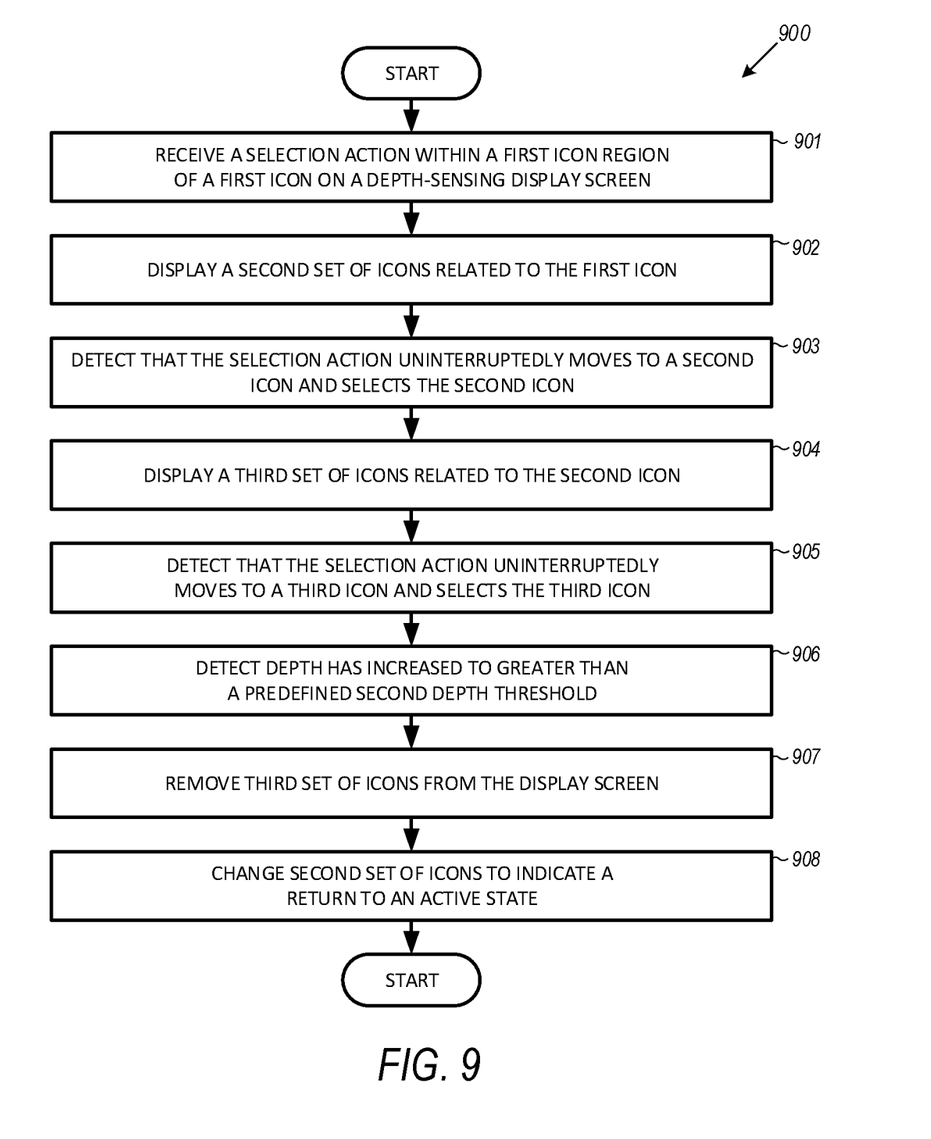
FIG. 9 is a flowchart of still another method of controlling an electronic device.

FIG. 9 is a flowchart 900 of another method of controlling an electronic device according to some embodiments. In the embodiments, the electronic device includes a display screen, wherein the display screen comprises a depth-sensing display screen, as previously discussed. The depth-sensing display screen displays a first icon or a first set of icons. In step 901, the method receives a selection action within a first icon region of a first icon on the depth-sensing display screen, as previously discussed. The selection action comprises a depth of an object to the depth-sensing display screen that is less than a predefined first depth threshold.

In step 902, the method displays a second set of icons related to the first icon, as previously discussed.

In step 903, the method detects that the selection action uninterruptedly moves to a second icon and selects the second icon, as previously discussed.

In step 904, the method displays a third set of icons related to the second icon, as previously discussed.

In step 905, the method detects that the selection action uninterruptedly moves to a third icon and selects the third icon, as previously discussed.

In step 906, the method detects that the depth has increased to greater than a predefined second depth threshold. Consequently, it is determined that the third icon is no longer being selected. The detection of the increase in the depth can occur before, during, or after detecting the selection of the third icon.

In step 907, the third set of icons is removed from the depth-sensing display screen, in response to the depth increasing to greater than the predefined second depth threshold.

In step 908, the display of the second set of icons is changed to indicate a return to the active state, in response to the depth increasing to greater than the predefined second depth threshold. Alternatively, the second set of icons can be re-displayed on the depth-sensing display screen if the second set of icons had been previously removed. A second icon of the second set of icons can now be selected. Alternatively, the second set of icons can be likewise de-selected, or other inputs or actions can occur.

Figure 10:
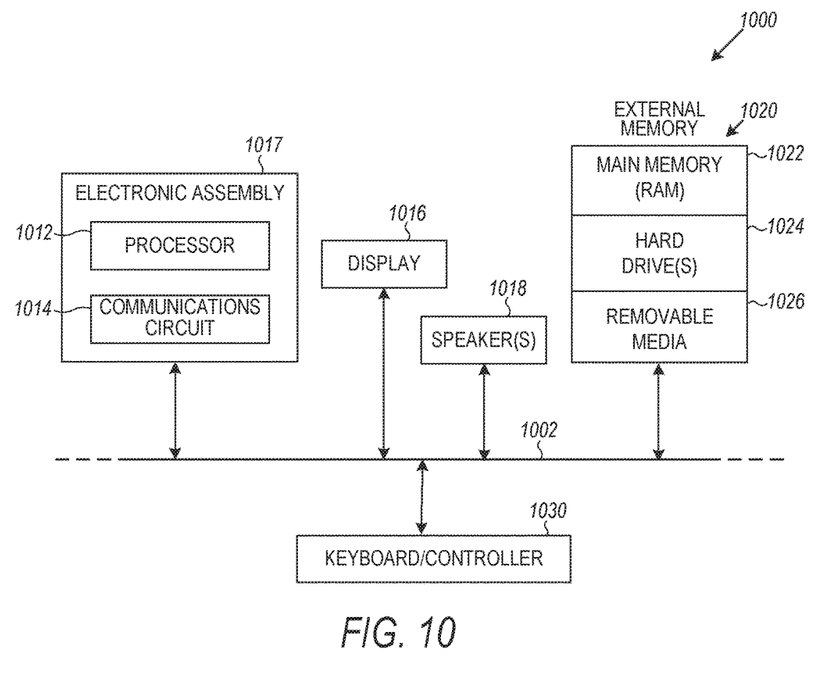
FIG. 10 is a block diagram of an example of an electronic system.

FIG. 10 is a block diagram of an example of an electronic system 1000 incorporating a display as described herein. Electronic system 1000 is merely one example of an electronic system in which embodiments can be used. Examples of electronic systems include, but are not limited to personal computers, tablet computers, mobile telephones, smart phones, game devices, MP3 or other digital music players, etc. In this example, electronic system 1000 comprises a data processing system that includes a system bus 1002 to couple the various components of the system. System bus 1002 provides communications links among the various components of the electronic system 1000 and can be implemented as a single bus, as a combination of busses, or in any other suitable manner.

The electronic assembly 1017 is coupled to system bus 1002. The electronic assembly 1017 can include any circuit or combination of circuits. In one embodiment, the electronic assembly 1017 includes a processor 1012 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 1017 are a custom circuit, an application-specific integrated circuit (ASIC), or the like, such as, for example, one or more circuits (such as a communications circuit 1014) for use in wireless devices like mobile telephones, personal data assistants, portable computers, two-way radios, and similar electronic systems. The IC can perform any other type of function.

The electronic system 1000 can also include an external memory 1020, which in turn can include one or more memory elements suitable to the particular application, such as a main memory 1022 in the form of random access memory (RAM), one or more hard drives 1024, and/or one or more drives that handle removable media 1026 such as compact disks (CD), flash memory cards, digital video disk (DVD), and the like.

The electronic system 1000 can also include a display screen 1016, one or more speakers 1018, and a keyboard and/or controller 1030, which can include a mouse, trackball, touch screen, voice-recognition device, or any other device that permits a system user to input information into and receive information from the electronic system 1000.

As explained above, the electronic system of FIG. 10 is merely one example of an electronic system in which embodiments can be used. In another example, the embodiments can be used as part of a virtual reality (VR) system. The display screen can be included in a wearable device and the sets of icons can be displayed on the wearable device. The sensor device that detects the user actions can be included in a touchpad of the VR system.

The systems, methods, and devices described herein include elements that simplify or streamline human interaction with electronic devices. By providing icons with multiple layers, a user is able to quickly navigate a user interface to find a target function. For example, as shown in FIGS. 1 through 5, a user may be able to quickly navigate from the contacts icon down to a chat application of a specific contact, and all in one continuous motion. Therefore, a user's experience with the device is improved.

ADDITIONAL DESCRIPTION AND EXAMPLES

Example 1 can include subject matter (such as a method of controlling operation of an electronic device, means for performing acts, or a machine-readable medium including instructions that, when performed by the machine, cause the machine to perform acts) comprising: the electronic device receiving a selection contact within a first icon region of a first icon displayed on a pressure-sensing display screen of the electronic device; the electronic device displaying on the pressure-sensing display screen a second set of icons related to the first icon; the electronic device detecting that the selection contact uninterruptedly moves to a second icon of the second set of icons and selects the second icon; the electronic device displaying on the pressure-sensing display screen a third set of icons related to the second icon; the electronic device detecting that the selection contact uninterruptedly moves to a third icon of the third set of icons and selects the third icon; and the electronic device initiating an application or function associated with the third icon.

In Example 2, the subject matter of Example 1 optionally includes detecting that the selection contact selects the second icon or the third icon comprising moving the selection contact within a predetermined area of the selected second icon.

In Example 3, the subject matter of Example 2 optionally includes detecting that the selection contact selects the second icon or the third icon comprising moving the selection contact within the predetermined area and increasing contact pressure to above a predefined second pressure threshold.

In Example 4, the subject matter of Example 3 optionally includes the electronic device detecting the pressure within the predetermined area has decreased to below the predefined second pressure threshold; the electronic device removing the third set of icons from the pressure-sensing display screen in response to detecting the pressure within the predetermined area has decreased to below the predefined second pressure threshold; and the electronic device changing the second set of icons to indicate a return of the second set of icons to an active state in response to detecting the pressure within the predetermined area has decreased to below the predefined second pressure threshold.

In Example 5, the subject matter of one or any combination of Examples 1-4 optionally includes detecting that the selection contact selects the second icon or the third icon comprising moving the selection contact within the predetermined area and lingering there for more than a predefined linger threshold.

In Example 6, the subject matter of e or any combination of Examples 1-5 optionally includes, after detecting the selection of the second icon, changing the first icon to visually indicate a first icon non-active state.

In Example 7, the subject matter of one or any combination of Examples 1-6 optionally includes, after detecting the selection of the second icon, changing the second set of icons to visually indicate a second icon set non-active state.

In Example 8, the subject matter of one or any combination of Examples 1-7 optionally includes the application or function being associated with the third icon and the second set of icons.

In Example 9, the subject matter of one or any combination of Examples 1-8 optionally includes the pressure-sensing display screen further comprising a depth-sensing display screen configured to detect a depth of an object to the depth-sensing display screen.

Example 10 can include subject matter (such as an apparatus or electronic device), or can optionally be combined with the subject matter of one or more of Examples 1-9 to include such subject matter, comprising a pressure-sensing display screen configured to display multiple icons and configured to measure a contact pressure of a contact with the pressure-sensing display screen; a sensor device configured to generate an indication representative of a user action relative to the pressure-sensing display screen; and a processor coupled to the pressure-sensing display screen and to the sensor device. The processor is configured to: receive a selection contact within a first icon region of a first icon displayed on the pressure-sensing display screen of the electronic device; display on the pressure-sensing display screen a second set of icons related to the first icon; detect that the selection contact uninterruptedly moves to a second icon of the second set of icons and selects the second con; display on the pressure-sensing display screen a third set of icons related to the second icon; detect that the selection contact uninterruptedly moves to a third icon of the third set of icons and selects the third icon; and initiate an application or function associated with the third icon.

In Example 11, the subject matter of Example 10 optionally includes detecting that the selection contact selects the second icon or the third icon comprising moving the selection contact within a predetermined area of the selected second icon.

In Example 12, the subject matter of Example 10 optionally includes detecting that the selection contact selects the second icon or the third icon comprising moving the selection contact within the predetermined area and increasing contact pressure to above a predefined second pressure threshold.

In Example 13, the subject matter of Example 12 optionally includes a processor configured to detect the pressure within the predetermined area has decreased to below the predefined second pressure threshold; remove the third set of icons from the pressure-sensing display screen in response to detecting the pressure within the predetermined area has decreased to below the predefined second pressure threshold; and change the second set of icons to indicate a return of the second set of icons to an active state in response to detecting the pressure within the predetermined area has decreased to below the predefined second pressure threshold.

In Example 14, the subject matter of one or any combination of Examples 10-13 optionally includes detecting that the selection contact selects the second icon or the third icon comprising moving the selection contact within the predetermined area and lingering there for more than a predefined linger threshold.

In Example 15, the subject matter of one or any combination of Examples 10-14 optionally includes a processor configured to, after detecting the selection of the second icon, changing the first icon to visually indicate a first icon non-active state.

In Example 16, the subject matter of one or any combination of Examples 10-15 optionally includes a processor configured to, after detecting the selection of the second icon, changing the second set of icons to visually indicate a second icon set non-active state.

In Example 17, the subject matter of one or any combination of Examples 10-16 optionally includes the application or function being associated with the third icon and the second set of icons.

In Example 18, the subject matter of one or any combination of Examples 10-17 optionally includes the pressure-sensing display screen further comprising a depth-sensing display screen configured to detect a depth of an object to the depth-sensing display screen.

Example 19 can include subject matter (such as non-transitory computer readable media storing computer instructions, that when executed by one or more processors, cause the one or more processors to perform specified operations), or can optionally be combined with the subject matter of one or any combination of Examples 1-18 to include such subject matter, comprising instructions to perform the steps of: receiving a selection contact within a first icon region of a first icon displayed on a pressure-sensing display screen of an electronic device; displaying on the pressure-sensing display screen a second set of icons related to the first icon; detecting that the selection contact uninterruptedly moves to a second icon of the second set of icons and selects the second icon; displaying on the pressure-sensing display screen a third set of icons related to the second icon; detecting that the selection contact uninterruptedly moves to a third icon of the third set of icons and selects the third icon; and initiating an application or function associated with the third icon.

Example 20 can include subject matter (such as a method of controlling operation of an electronic device, means for performing acts, or a machine-readable medium including instructions that, when performed by the machine, cause the machine to perform acts) or can optionally be combined with the subject matter of one or any combination of Examples 1-19 to include such subject matter comprising: the electronic device receiving a selection action within a first icon region of a first icon displayed on a depth-sensing display screen of the electronic device; the electronic device displaying on the depth-sensing display screen a second set of icons related to the first icon; the electronic device detecting that the selection action uninterruptedly moves to a second icon of the second set of icons and selects the second icon; the electronic device displaying on the depth-sensing display screen a third set of icons related to the second icon; the electronic device detecting that the selection action uninterruptedly moves to a third icon of the third set of icons and selects the third icon; and the electronic device initiating an application or function associated with the third icon.

In Example 21, the subject matter of Example 20 optionally includes detecting that the selection action selects the second icon or the third icon comprising moving the selection action within a predetermined area of the selected, second icon.

In Example 22, the subject matter of one or both of Examples 20 and 21 optionally includes detecting that the selection action selects the second icon or the third icon comprising moving the selection action within the predetermined area and decreasing the depth to less than a predefined second depth threshold.

In Example 23, the subject matter of Example 22 optionally includes the electronic device detecting the depth within the predetermined area has increased to greater than the predefined second depth threshold; the electronic device removing the third set of icons from the depth-sensing display screen in response to detecting the depth within the predetermined area has increased to greater than the predefined second depth threshold; and the electronic device changing the second set of icons to indicate a return of the second set of icons to an active state in response to detecting the depth within the predetermined area has increased to greater than the predefined second depth threshold.

In Example 24, the subject matter of one or any combination of Examples 20-23 optionally includes detecting that the selection action selects the second icon or the third icon comprising moving the selection action within the predetermined area and lingering there for more than a predefined linger threshold.

In Example 25, the subject matter of one or any combination of Examples 20-24 optionally includes, after detecting the selection of the second icon, changing the first icon to visually indicate a first icon non-active state.

In Example 26, the subject matter of one or any combination of Examples 20-25 optionally includes, after detecting the selection of the second icon, changing the second set of icons to visually indicate a second icon set non-active state.

In Example 27, the subject matter of one or any combination of Example 20-26 optionally includes the application or function being associated with the third icon and the second set of icons.

In Example 28, the subject matter of one or any combination of Examples 20-27 optionally includes the depth-sensing display screen further comprising a pressure-detecting display screen configured to measure a contact pressure of a contact with the pressure-sensing display screen.

Example 29 can include subject matter (such as an apparatus or electronic device), or can optionally be combined with the subject matter of one or more of Examples 1-28 to include such subject matter, comprising a depth-sensing display screen configured to display multiple icons and configured to detect a depth of an object to the depth-sensing display screen; a sensor device configured to generate an indication representative of a user action relative to the display screen; and a processor coupled to the display screen and the sensor device, wherein the processor is configured to: receive a selection action within a first icon region of a first icon displayed on the display screen of the electronic device; display on the display screen a second set of icons related to the first icon; detect that the selection action uninterruptedly moves to a second icon of the second set of icons and selects the second icon; display on the display screen a third set of icons related to the second icon; detect that the selection action uninterruptedly moves to a third icon of the third set of icons and selects the third icon; and initiate an application or function associated with the third icon.

In Example 30, the subject matter of Example 29 optionally includes detecting that the selection action selects the second icon or the third icon comprising moving the selection action within a predetermined area of the selected second icon.

In Example 31, the subject matter of one or both of Examples 29 and 30 optionally includes detecting that the selection action selects the second icon or the third icon comprising moving the selection action within the predetermined area and decreasing the depth to less than a predefined second depth threshold.

In Example 32, the subject matter of Example 31 optionally includes a processor configured to detect the depth within the predetermined area has increased to greater than the predefined second depth threshold; remove the third set of icons from the display screen in response to detecting the depth within the predetermined area has increased to greater than the predefined second depth threshold; and change the second set of icons to indicate a return of the second set of icons to an active state in response to detecting the depth within the predetermined area has increased to greater than the predefined second depth threshold.

In Example 33, the subject matter of one or any combination of Examples 29-32 optionally includes detecting that the selection contact selects the second icon or the third icon comprising moving the selection contact within the predetermined area and lingering there for more than a predefined linger threshold.

In Example 34, the subject matter of one or any combination of Examples 29-33 optionally includes a processor configured to, after detecting the selection of the second icon, changing the first icon to visually indicate a first icon non-active state.

In Example 35, the subject matter of one or any combination of Examples 29-34 optionally includes a processor configured to, after detecting the selection of the second icon, changing the second set of icons to visually indicate a second icon set non-active state.

In Example 36, the subject matter of one or any combination of Examples 29-35 optionally includes the application or function being associated with the third icon and the second set of icons.

In Example 37, the subject matter of one or any combination of Examples 29-36 optionally includes the pressure-sensing display screen further comprising a depth-sensing display screen configured to detect a depth of an object to the depth-sensing display screen.

Example 38 can include subject matter (such as non-transitory computer readable media storing computer instructions, that when executed by one or more processors, cause the one or more processors to perform specified operations), or can optionally be combined with the subject matter of one or any combination of Examples 1-37 to include such subject matter, comprising instructions to perform the steps of: receiving a selection action within a first icon region of a first icon displayed on a depth-sensing display screen of an electronic device; displaying on the depth-sensing display screen a second set of icons related to the first icon; detecting that the selection action uninterruptedly moves to a second icon of the second set of icons and selects the second icon; displaying on the depth-sensing display screen a third set of icons related to the second icon; detecting that the selection action uninterruptedly moves to a third icon of the third set of icons and selects the third icon; and initiating an application or function associated with the third icon.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks magnetic cassettes, memory cards or sticks, random access memories (RAMs), read only memories (ROMs), and the like.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method of controlling an electronic device, comprising:

the electronic device receiving a depth measured by a depth-sensing display screen of the electronic device, the depth-sensing display screen detecting the depth of an object in proximity to the depth-sensing display screen without the object physically contacting the depth-sensing display screen;

the electronic device detecting a selection action within a first icon region of a first icon or a first set of icons displayed on the depth-sensing display screen and the selection action therefore selecting the first icon, the detecting comprising determining that the depth of the object to the depth-sensing display screen is less than a predefined first depth threshold, and the electronic device generating a selection indication on the depth-sensing display screen;

the electronic device displaying a second set of icons on the depth-sensing display screen and changing the first icon to visually indicate a first icon non-active state, the second set of icons being related to the first icon;

the electronic device detecting that the selection action uninterruptedly moves to a second icon of the second set of icons and detecting that the selection action therefore selects the second icon, the selection action comprising determining that the depth of the object over the second icon is less than a predefined second depth threshold and the object lingering over the second icon for more than a predefined linger threshold;

the electronic device displaying a third set of icons on the depth-sensing display screen and changing the second set of icons to visually indicate a second icon set non-active state, the third set of icons being related to the second icon;

the electronic device detecting that the selection action uninterruptedly moves to a third icon of the third set of icons and the selection action therefore selecting the third icon, the selection action comprising determining a depth of the object over the third icon is less than a predefined third depth threshold and determining the object lingering over the third icon for more than the predefined linger threshold;

the electronic device initiating an application or function associated with the third icon; and the electronic device detecting when the depth of the object has increased to greater than the predefined third depth threshold, removing the third set of icons from the depth-sensing display, and changing the second set of icons to a second icon set active state.

2. The method of claim 1, with detecting that the selection action selects the second icon comprising moving the selection action within a predetermined second icon area of the second icon.

3. The method of claim 1, further comprising the electronic device restoring an original appearance of selected and unselected icons of the second set of icons when determining the selection action exceeds the predetermined second depth threshold.

4. The method of claim 3, wherein the detecting that the selection action selects the third icon comprises moving the selection action within a predetermined third icon area of the third icon.

5. The method of claim 3, wherein the detecting that the selection action selects the first icon comprises moving the selection action within a predetermined first icon area of the first icon.

6. The method of claim 1, with the application or function being associated with the third icon and the second set of icons.

7. The method of claim 1, further comprising the electronic device restoring an original appearance of selected and unselected icons of the first set of icons after detecting the selection action exceeds the predetermined first depth threshold.

8. The method of claim 1, further comprising the electronic device restoring an original appearance of selected and unselected icons of the third set of icons after detecting the selection action exceeds the predetermined third depth threshold.

9. The method of claim 1, with the application or function being associated with the first icon, the second icon, and the third icon.

10. An electronic device, comprising:
a depth-sensing display screen detecting a depth of an object in proximity to the depth-sensing display screen without the object physically contacting the depth-sensing display screen;
a processor coupled to the depth-sensing display screen, the processor configured to:
detect a selection action within a first icon region of a first icon or a first set of icons displayed on the depth-sensing display screen and select the first icon, the detecting comprising detecting that the depth of the object to the depth-sensing display screen is less than a predefined first depth threshold, and generate a selection indication on the depth-sensing display screen;
display a second set of icons on the depth-sensing display screen and change the first icon to visually indicate a first icon non-active state, the second set of icons being related to the first icon;
detect that the selection action uninterruptedly moves to a second icon of the second set of icons and detect that the selection action therefore selects the second icon, the selection action comprising determining that the depth of the object over the second icon is less than a predefined second depth threshold and the object lingering over the second icon for more than a predefined linger threshold;
display a third set of icons on the depth-sensing display screen and change the second set of icons to visually indicate a second icon set non-active state, the third set of icons being related to the second icon;
detect that the selection action uninterruptedly moves to a third icon of the third set of icons and the selection action therefore selects the third icon, the selection action comprising determining a depth of the object over the third icon is less than a predefined third depth threshold and determining the object lingering over the third icon for more than the predefined linger threshold;
initiate an application or function associated with the third icon; and detect when the depth of the object has increased to greater than the predefined third depth threshold, remove the third set of icons from the depth-sensing display and change the second set of icons to a second icon set active state.

11. The electronic device of claim 10, with detecting that the selection action selects the second icon comprising moving the selection action within a predetermined second icon area of the second icon.

12. The electronic device of claim 11, with the processor further configured to:
detect that the selection action selects the third icon comprising moving the selection action within a predetermined area of the third icon.

13. The electronic device of claim 10, wherein the processor is further configured to restore an original appearance of unselected icons of the second set of icons when determining the selection action exceeds the predetermined second depth threshold.

14. The electronic device of claim 13, wherein the detecting that the selection action selects the first icon comprises moving the selection action within a predetermined first icon area of the first icon.

15. The electronic device of claim 10, with the application or function being associated with the third icon and the second set of icons.

16. The electronic device of claim 10, further comprising the electronic device restoring an original appearance of selected and unselected icons of the first set of icons after detecting the selection action exceeds the predetermined first depth threshold.

17. The electronic device of claim 10, further comprising the electronic device restoring an original appearance of selected and unselected icons of the third set of icons after detecting the selection action exceeds the predetermined third depth threshold.

18. The electronic device of claim 10, with the application or function being associated with the first icon, the second icon, and the third icon.

19. A non-transitory computer readable media storing computer instructions, that when executed by one or more processors, cause the one or more processors to perform the steps of:
detecting a selection action within a first icon region of a first icon or a first set of icons displayed on a depth-sensing display screen and the selection action therefore selecting the first icon, the detecting comprising determining that a depth of the object to the depth-sensing display screen is less than a predefined first depth threshold, the depth-sensing display screen detecting the depth of the object in proximity to the depth-sensing display screen without the object physically contacting the depth-sensing display screen;
displaying a second set of icons on the depth-sensing display screen and changing the first icon to visually indicate a first icon non-active state, the second set of icons being related to the first icon;
detecting that the selection action uninterruptedly moves to a second icon of the second set of icons and determining that the selection action therefore selects the second icon, the selection action comprising determining that the depth of the object over the second icon is less than a predefined second depth threshold and the object lingering over the second icon for more than a predefined linger threshold;
displaying a third set of icons on the depth-sensing display screen and changing the second set of icons to visually indicate a second icon set non-active state, the third set of icons being related to the second icon;

detecting that the selection action uninterruptedly moves to a third icon of the third set of icons and the selection action therefore selects the third icon, the selection action comprising determining a depth of the object over the third icon is less than a predefined third depth threshold and determining the object lingering over the third icon for more than the predefined linger threshold;

initiating an application or function associated with the third icon; and detecting when the depth of the object has increased to greater than the predefined third depth threshold, removing the third set of icons from the depth-sensing display, and changing the second set of icons to a second icon set active state.

* * * * *

UNITED STATES PATENT AND TRADEMARK OFFICE
CERTIFICATE OF CORRECTION

PATENT NO. : 11,334,237 B2
APPLICATION NO. : 16/164423
DATED : May 17, 2022
INVENTOR(S) : Lin et al.

It is certified that error appears in the above-identified patent and that said Letters Patent is hereby corrected as shown below:

In the Claims

Column 16, Line 4, Claim 10, after "display", insert --,--

Column 16, Line 14, Claim 12, before "area", insert --third icon--

Signed and Sealed this
Fifth Day of July, 2022

Katherine Kelly Vidal
*Director of the United States Patent and Trademark Office*